(12) United States Patent
Monti

(10) Patent No.: US 6,736,269 B2
(45) Date of Patent: May 18, 2004

(54) DEVICE FOR COLLECTING AND RECYCLING ARTICLES DIRECTED TO FEEDING CHANNELS

(75) Inventor: Giuseppe Monti, Bologna (IT)

(73) Assignee: Marchesini Group S.p.A., Bologna (IT)

( * ) Notice: Subject to any disclaimer, the term of this patent is extended or adjusted under 35 U.S.C. 154(b) by 0 days.

(21) Appl. No.: 10/336,415

(22) Filed: Jan. 3, 2003

(65) Prior Publication Data
US 2003/0127371 A1 Jul. 10, 2003

(30) Foreign Application Priority Data
Jan. 8, 2002 (IT) .................................. BO2002A0004

(51) Int. Cl.[7] ................................................ B07B 1/40
(52) U.S. Cl. ........................................ 209/240; 209/309
(58) Field of Search ................................. 209/240, 309

(56) References Cited
U.S. PATENT DOCUMENTS 1,792,962 A * 2/1931 Barker ....................... 209/135
2,954,122 A * 9/1960 Colburn ......................... 209/8
3,960,738 A * 6/1976 O'Brien et al. .......... 430/137.1
3,994,801 A * 11/1976 Colburn ....................... 209/214
4,260,477 A * 4/1981 Corrans ....................... 209/38
4,784,755 A * 11/1988 Taylor ........................ 209/136

* cited by examiner

Primary Examiner—Donald P. Walsh
Assistant Examiner—Jonathan R Miller
(74) Attorney, Agent, or Firm—William J. Sapone; Coleman Sudol Sapone, P.C.

(57) ABSTRACT

In a device for collecting and re-cycling articles sent toward feeding channels, a selecting member is situated downstream of a station where the articles are accumulated, for receiving, in a predetermined way, the articles from the accumulation station. The selecting member selects and holds complying articles, separating them from fragments and from powders associated thereto. A linear conveyor member, situated downstream of the selecting member, receives the complying articles and sends them in ordered way to inlets of the feeding channels. Collecting means are situated downstream of the inlets for receiving, from the linear conveyor member, the exceeding articles situated near the inlets. Transferring means receive, from the collecting means, the exceeding articles and transfer them to an initial section of the selecting member, so that the articles are collected, recycled and their compliance is verified again.

6 Claims, 3 Drawing Sheets

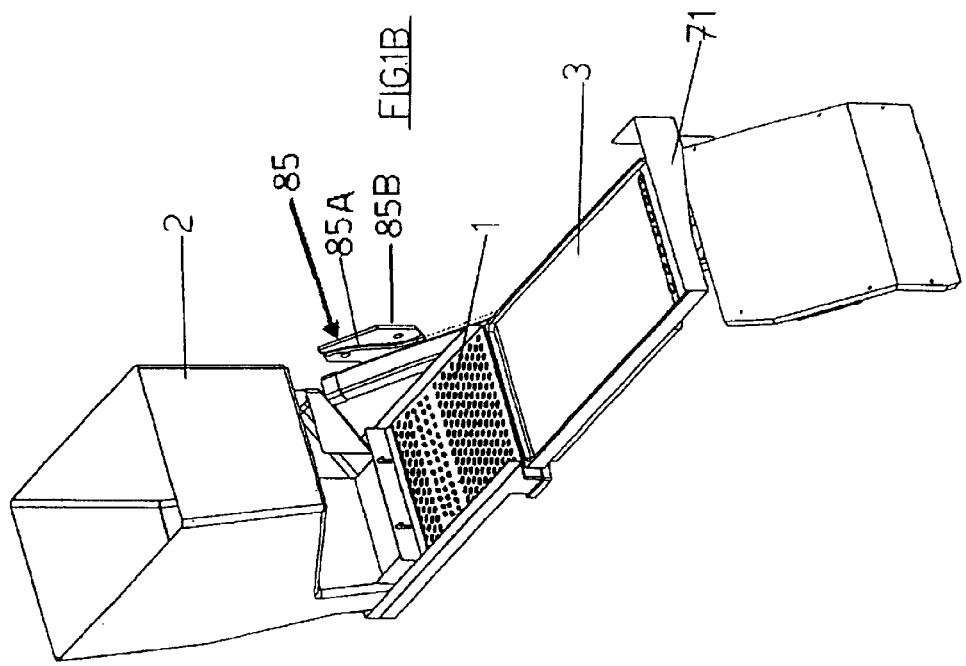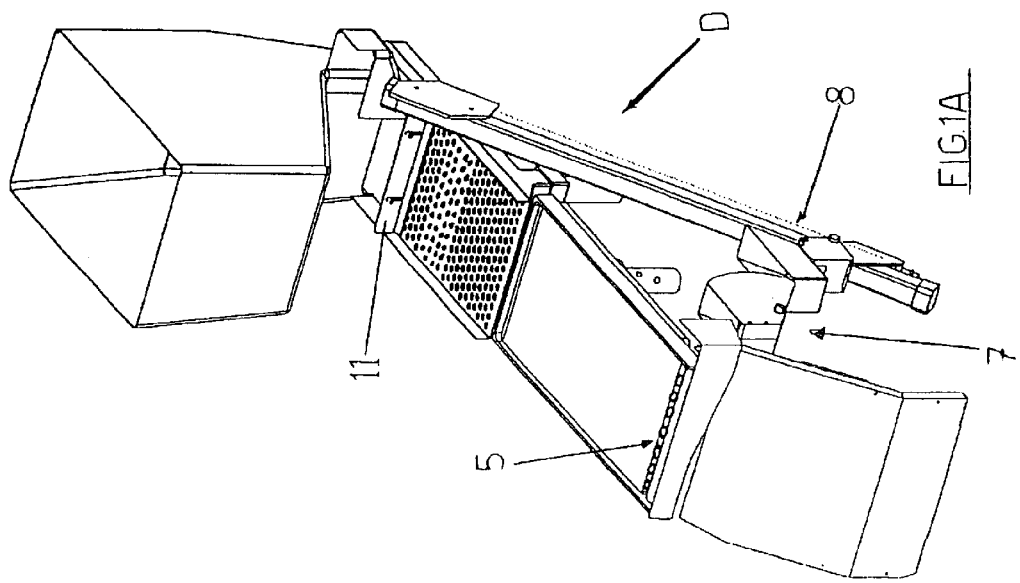

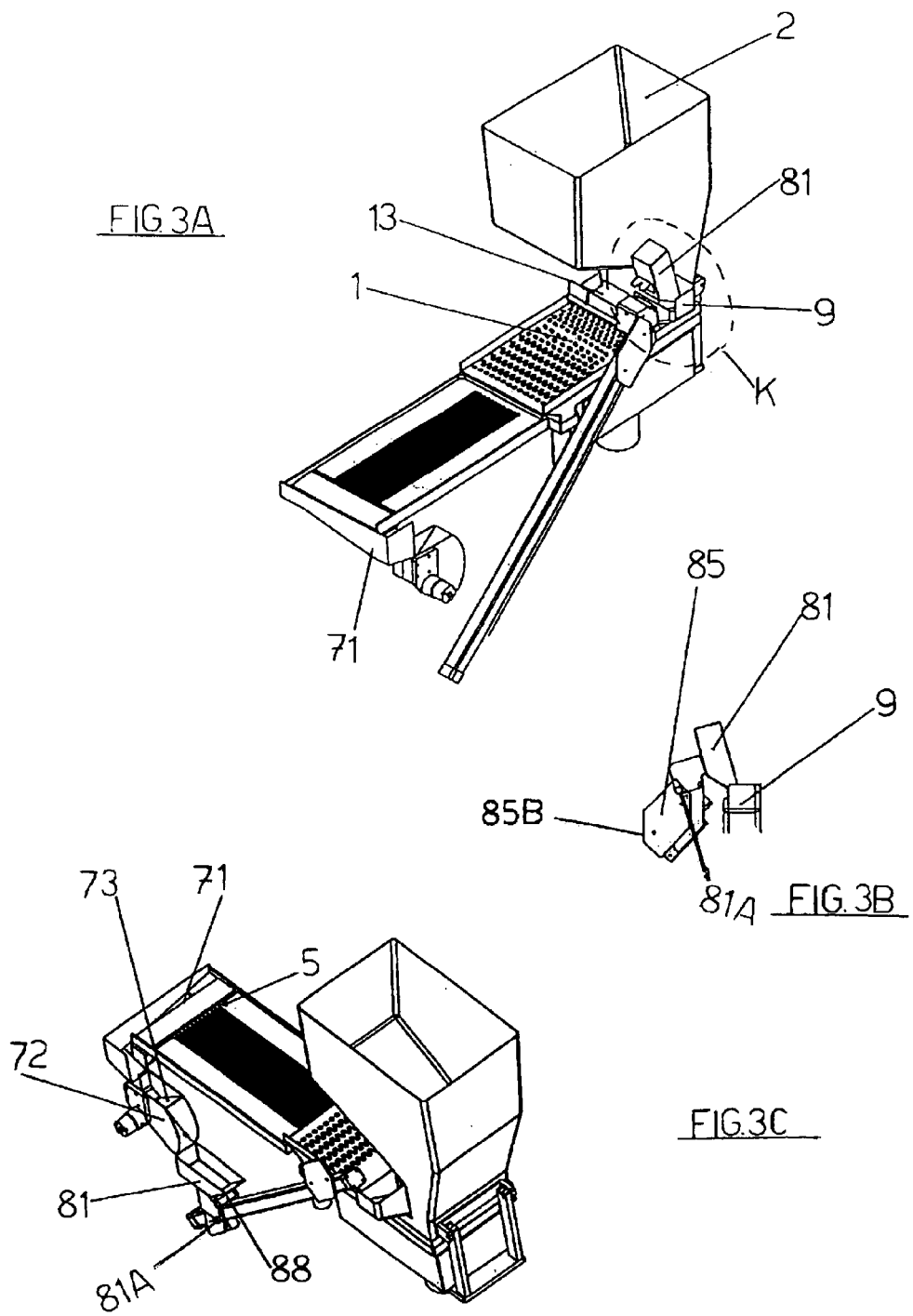

DEVICE FOR COLLECTING AND RECYCLING ARTICLES DIRECTED TO FEEDING CHANNELS

FIELD OF THE INVENTION

The present invention relates to devices for transferring articles, delivered by a magazine, to inlets of channels for feeding blister bands.

More particularly, the present invention relates to a device for collecting and recycling exceeding articles, like for instance, tablets, capsules, pills, etc. directed to feeding channels, e.g. channels for feeding blister bands.

DESCRIPTION OF THE PRIOR ART

Known devices for transferring articles, like for instance, tablets, capsules, pills, etc. received from a magazine situated upstream or above thereof, include a linear vibrating conveyor, which arranges and directs these articles toward inlets of channels for feeding blister bands situated therebelow.

The usual working modes by which the transferring devices direct the articles to the inlets of the feeding channels, and the way of operation for feeding the blister bands performed by the channels, determine a surplus of these articles in the region of the inlets.

In time, the surplus of articles at the inlets of the channels can become excessive; in order to avoid this, there are transferring devices, known in the prior art, which include means operated mechanically to collect the exceeding articles and to take them again to the transferring device.

For example, one of the used solutions for collecting the exceeding articles includes positioning, at the inlets of the feeding channels, brush means which push the articles in excess, accumulated near the inlets, backwards onto the linear vibrating conveyor.

The document EP-A-0555662 describes a device for transferring articles of small dimensions, such as tablets, capsules, pills, and the like, which includes a first forward linear vibrating conveyor, which receives the articles from a corresponding upper magazine and transfers them downstream toward a subsequent feeding station, while arranging them in a correct position, and a second backward linear vibrating conveyor, which receives the articles not correctly arranged, and/or in excess, from the final section of the first conveyor and then transfers them upstream, re-positioning them into the initial section of the first conveyor.

The articles in excess or not correctly oriented and arranged are transferred from the first forward conveyor to the second return conveyor due to a particular technique including mechanical operating the vibration of the first conveyor, which has, in the region corresponding to the final portion, transversal component sending the articles in excess to the second conveyor.

However, the known devices for collecting the articles in excess do not include a check operation of these articles before returning them to the conveyor, that would be necessary to reject those articles which have been damaged during the backward transferring to such extent that makes them unsuitable to be packaged into blister packs.

In fact, the collecting operation of the articles in excess can provoke damages to the latter, such as scratches or chipping, due to possible collision which the articles undergo.

Moreover, during different collecting steps, the exceeding articles can break due to possible collision and, consequently, they are no longer suitable for being sent toward the feeding channels of the blister bands.

SUMMARY OF THE INVENTION

The object of the present invention is to propose a device for collecting and recycling articles directed to the feeding channels, which is able to avoid the above mentioned drawbacks.

More in particular, the main object of the present invention is to propose a device, which collects and recycles the articles in excess situated near inlets of the feeding channels and, moreover performs a check operation to determine the adequacy of the collected articles before they are recycled to the inlets.

The above mentioned objects are obtained, in accordance with the contents of the claims, by a device for collecting and re-cycling articles sent toward feeding channels, including:

a station, where the articles are accumulated;

a selecting member, situated downstream of said accumulation station for receiving, in a predetermined way, said articles from said accumulation station, said selecting member being aimed at selecting and holding complying articles, separating them from faulty, fragmented articles and from powders present among said articles;

a linear conveyor member, situated downstream of said selecting member, aimed at receiving, from said selecting member, said complying articles and at sending them in ordered way to the inlets of said feeding channels;

collecting means, situated directly downstream of said inlets and aimed at receiving, from said conveyor member, the exceeding articles accumulated near the inlets, and transferring means, aimed at receiving, from said collecting means, exceeding articles and at transferring said exceeding articles to an initial section of said selecting member, so that the articles are verified, re-cycled and their compliance is verified again.

BRIEF DESCRIPTION OF THE DRAWINGS

The characteristic features of the present invention will be pointed out in the following description of a preferred embodiment of a device for collecting and recycling articles directed to feeding channels, illustrated as an example, with reference to the enclosed drawings, in which:

FIG. 1A and FIG. 1B are schematic, perspective lateral-front views of the device for collecting and recycling articles directed to feeding channels proposed by the present invention;

FIG. 3A is a schematic perspective lateral view of the article collecting final step performed by the device proposed by the present invention, while FIG. 3B shows a lateral view of the particular indicated with K in FIG. 3A;

FIG. 3C is a schematic perspective lateral-back view of the device proposed by the present invention as a whole.

BEST MODE OF CARRYING OUT THE INVENTION

Figure 2A:
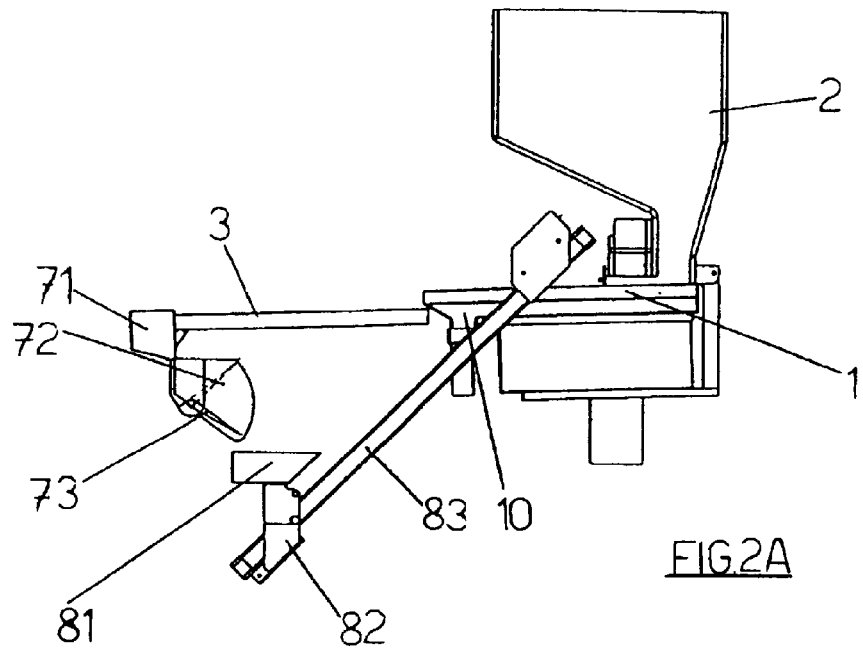
FIG. 2A and FIG. 2B are schematic lateral views of two different article collecting operation steps performed by the proposed device.
Figure 2B:
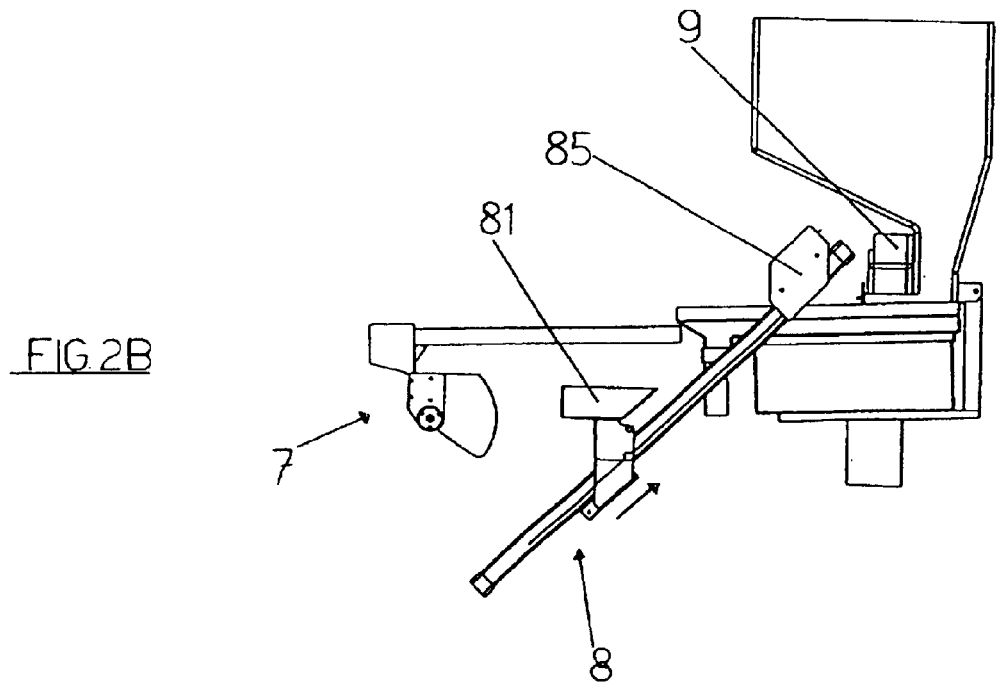

With reference to the enclosed drawings, the reference D indicates the device for collecting and re-cycling articles to be conveyed to feeding channels, proposed by the present invention.

The device D includes a sorting or selecting member 1, situated directly downstream of, and below, a station 2, where articles are accumulated, including e.g. as shown in the proposed figures, a hopper for receiving the articles in a predetermined way, and a linear conveyor member 3, situated downstream of the selecting member 1.

The articles can be tablets, capsules, pills and the like, and must be conveyed to the inlets 5 of the channels aimed at feeding blister bands situated below (not shown in the enclosed figures), from which blister packs to be packaged are then obtained.

The selecting member 1 selects, among the articles received from the hopper 2, and keeps the articles complying with the requirements, separating them from damaged or fragmented articles and from powders inevitably present along with them, and transfers the complying articles to the conveyor member 3.

For this purpose, the selecting member 1 can include, as shown in the accompanying figures, a vibrating screen, with a unit 10 connected to its lower part for collecting articles rejected thereby.

Therefore, the vibrating screen selects and holds only complying articles chosen from all the articles received from the hopper, i.e. only those capsules, tablets, pills and the like, which are not damaged, chipped, fragmented, in other words, articles, whose shape is equal or bigger than a minimum desired and predetermined dimension, and transfers these articles to the conveyor member 3.

Suitably, the vibrating screen presents holes, whose diameter is such that articles, whose dimensions correspond to the minimum desired dimensions predetermined for the suitable tablets and pills, are held and transferred, whereas faulty articles, i.e. those chipped or fragmented, whose dimensions are smaller than the predetermined ones, are discarded by letting them fall down into the collecting unit 10, situated below.

Moreover, due to the vibrating motion, the vibrating screen separates the articles from the pulverulent particles accumulated thereon.

A scraping element 11 is connected to the upper part of the vibrating screen acting on the articles received from the accumulation station 2.

The scraping element 11 allows to distribute the articles uniformly on the whole surface of the screen and to regulate the height of the layer of accumulated articles.

The linear conveyor member 3 arranges in good order the complying articles received from the selecting member 1 and transfers them toward the inlets 5 of the feeding channels situated downstream of the selecting member 1.

The linear conveyor member 3 can suitably be a vibrating conveyor inclined toward the inlets 5 of said feeding channels.

The device D includes also, collecting means 7, situated directly downstream of the inlets 5 of the feeding channels and aimed at receiving, from the conveyor member 3, the exceeding articles accumulated near the inlets 5.

Moreover, the device D includes transferring means 8, aimed at receiving, from the collecting means 7, the exceeding articles and at transferring them to the initial section of the selecting member 1, so that they are collected, re-cycled and their compliance is controlled again.

In this way, also the collected articles to be re-cycled are subjected again to the compliance verify.

Actually, during the transferring, the articles can be subjected to thrusts which can damage them (e.g. scratches, chipping) and consequently, the articles can be fragmented and their dimensions are not suitable or are smaller than the minimum predetermined dimensions: thus, the damaged articles are rejected by the vibrating screen.

The collecting means 7 can include, as shown for example in the proposed figures, a chute 71, which is arranged crosswise, directly downstream of the inlets 5 of the feeding channels, and which is aimed at receiving, from the linear vibrating conveyor 3, the exceeding articles, accumulated near the inlets 5, and at transferring them into a basket 72.

The basket 72 includes a mobile wall 73, which can be tilted for discharging, usually in closed configuration (shown with broken line in FIG. 2A), which can be operated, in a predetermined way and at predetermined intervals, to open (continuous lines in FIG. 2A), in order to discharge the exceeding articles, contained in the basket 72, onto the conveying means 8.

The conveying means 8 include, as in the example shown in the enclosed figures, a carriage 81 for collecting exceeding articles received from the basket 72, hinged to a slide 82, which reciprocates along a guide 83 extending from the basket 72, at a position below the latter, up to the initial section 13 of the selecting member 1, at a position above and beside the latter.

In a region corresponding to the end situated near the selecting member 1, the guide 83 is equipped with suitable overturning means 85, which are aimed at overturning the carriage 81 with respect to the guide 83 in order to discharge the exceeding articles into the initial section of the selecting member 1.

For this purpose, the device D includes a channel-shaped chute 9 inclined and situated above the selecting member 1, in a region corresponding to its initial section 13. The channel-shaped chute is adapted to receive articles discharged by the carriage 81 and to convey them to the selecting member 1.

The overturning means 85 can include, as shown in the enclosed figures, suitably shaped cam means 85a and 85b. When the cam means are engaged by a corresponding abutment element 88, e.g. an idle roll, connected crosswise to the carriage 81, this latter is overturned by pivoting about hinge 81a.

The stroke of the carriage 81, from the lower end of the guide 83, where the exceeding articles are received from the basket 72, to the upper end of the guide 83, where the carriage is overturned and the articles are discharged into the channel-shaped chute 9, is suitably coordinated with the opening and closing of the discharge wall 73 of the basket 72.

According to a possible variation, not shown, the above mentioned transferring means 8 can include e.g. suitable transport belts, which receive the exceeding articles from the basket 72 and transfers them to the initial section 13 of the selecting member 1.

It is evident from what has been written above, how the proposed device allows to collect, in a simple and efficient way, the exceeding articles accumulated near the inlets of the feeding channels.

The device proposed by the present invention allows also, in an extremely advantageous way, to control the compliance of the collected articles, before they are re-sent toward the inlets of the feeding channels, in order to reject those articles, which have been damaged during the collecting transferring, e.g. scratched and/or chipped, which are fragmented, or on which pulverulent substances have deposited.

The above mentioned advantages have been obtained by a technical solution, which is extremely functional and reliable in any operation conditions.

What is claimed is:

1. A device for collecting and re-cycling articles sent toward feeding channels, comprising:

a station, where the articles are accumulated;

a selecting member, situated downstream of said accumulation station for receiving, in a predetermined way, said articles from said accumulation station, said selecting member selecting and holding complying articles, separating the complying articles from faulty, fragmented articles and from powders present among said articles;

a linear conveyor member, situated downstream of said selecting member, for receiving, from said selecting member, said complying articles and sending the complying articles to inlets of said feeding channels;

collecting means, situated directly downstream of said inlets for receiving, from said conveyor member, the exceeding articles accumulated near the inlets, and transferring means, for receiving, from said collecting means, exceeding articles and transferring said exceeding articles to an initial section of said selecting member, the exceeding articles verified as being compliant articles, re-cycled and verified again as being compliant articles.

2. A device according to claim 1, wherein said collecting means include a chute, for receiving the exceeding articles from said conveyor member, and transferring the exceeding articles into a lower basket, equipped with a movable discharge wall, usually in a closed configuration, being movable to an open configuration in a predetermined way and at predetermined intervals, in order to discharge the exceeding articles, onto said conveying member.

3. A device according to claim 1, wherein said conveying member has a carriage for collecting said exceeding articles received from said collecting means, the carriage being hinged to a slide, which reciprocates along a guide extending from said collecting means, below the collecting means, to said initial section of said selecting member, above and beside the selecting member, said guide being equipped, at a region corresponding to an end situated near said selecting member, with overturning means for overturning the carriage with respect to said guide in order to discharge the exceeding articles into the initial section of said selecting member.

4. A device according to claim 3, including, situated above the selecting member and in a region corresponding to the initial section, an inclined channel-shaped chute, for receiving exceeding articles from said overturned carriage and conveying the exceeding articles to the selecting member.

5. A device according to claim 3, wherein said overturning means include shaped cam means, engagable with a corresponding abutment element, connected to said carriage, for overturning said carriage.

6. A device according to claim 5, wherein said abutment element includes an idle roller, connected to said carriage, crosswise to said guide.

* * * * *